(12) United States Patent
Forster

(10) Patent No.: US 6,443,290 B1
(45) Date of Patent: Sep. 3, 2002

(54) HYDROSTATIC HUB DRIVE

(75) Inventor: Franz Forster, Karlstadt-Muhlbach (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/672,354

(22) Filed: Sep. 28, 2000

(30) Foreign Application Priority Data

Oct. 7, 1999 (DE) .......................................... 199 48 380
May 9, 2000 (DE) .......................................... 100 22 490

(51) Int. Cl.⁷ ............................................. B60K 17/14
(52) U.S. Cl. .................................. 192/221.1; 180/308
(58) Field of Search ....................... 192/221.1; 180/307, 180/308; 475/83

(56) References Cited

U.S. PATENT DOCUMENTS

| | | | | |
|---|---|---|---|---|
| 4,213,514 A | * | 7/1980 | Ehrlinger et al. | ........... 180/308 |
| 5,398,776 A | * | 3/1995 | Forster | ........................ 180/308 |
| 5,918,529 A | | 7/1999 | Forster | ........................ 92/12.2 |
| 6,135,259 A | * | 10/2000 | Forster | .................... 192/221.1 |
| 6,260,653 B1 | * | 7/2001 | Forster | ........................ 180/308 |

FOREIGN PATENT DOCUMENTS

WO  WO 93/04281 A1 * 3/1993 ................. 180/308

* cited by examiner

Primary Examiner—Richard M. Lorence
(74) Attorney, Agent, or Firm—Webb Ziesenheim Lodgsdon Orkin & Hanson, P.C.

(57) ABSTRACT

A hydrostatic hub drive with an integrated axial piston machine utilizing a swashplate design, in particular a wheel hub drive, has a stationary hub carrier in the form of a machine housing of the axial piston machine, a hub formed by a machine shaft and mounted inside the hub carrier so that it can rotate, and a hub bearing in the form of a shaft bearing. The axial piston machine is configured as an individual drive unit and has an individual cylinder block on the machine shaft that extends out of the machine housing through an outlet opening. A swashplate is located in an area near the outlet opening and a control base receptacle is located in an area farther from the outlet opening. The axial piston motor is preferably a fixed displacement motor and has a swashplate that is shaped into the machine housing, which swashplate is oriented so that the radial components of the propulsion forces, under operating conditions, are effectively directed opposite to the external forces acting on the hub bearing system. A brake in the form of a wet-running, spring-loaded, multiple-disc brake can be located radially between the cylinder block and the machine housing. It is also possible to locate the brake in a recess of the cover. Shaped onto the machine shaft is a wheel flange that can hold at least one wheel rim, which wheel flange as a rim centering device and concentric threaded borings.

17 Claims, 2 Drawing Sheets

HYDROSTATIC HUB DRIVE

BACKGROUND OF THE INVENTION

1. Field of the Invention

This invention relates to a hydrostatic hub drive with an integrated axial piston machine employing a swashplate design, in particular a wheel hub drive, with a stationary hub carrier in the form of a machine housing of the axial piston machine, a hub formed by a machine shaft and mounted inside the hub carrier so that it can rotate, and a hub bearing in the form of a shaft bearing.

2. Technical Considerations

A hub drive is described in DE 196 42 021 A1. This document describes two synchronously rotating cylinder blocks that are at an axial distance from each other. Each cylinder block contains a group of concentric cylinder bores, between which and at an angle to the axis of rotation of the axial piston machine that is in the form of a wheel motor, there is a non-rotating swashplate in the shape of a circular ring. Pistons that move longitudinally in the cylinder bores and are configured so that they displace hydraulic fluid on both ends of the pistons are supported against the pivotably mounted swashplate. These pistons each consist of two piston segments that have the same diameter, are at a distance from each other, are coaxial in relation to each other, are inserted in cylinder bores opposite one another, and are connected to each other by a bridge segment.

An object of this invention is to provide a hydrostatic hub drive of the general type described above but which is easier and more economical to manufacture and assemble than comparable known devices.

SUMMARY OF THE INVENTION

In a hub drive of the invention, the axial piston machine is configured as an individual drive unit having an individual cylinder block on a machine shaft that projects out of a machine housing through an outlet opening. A swashplate is located in an area close to or adjacent the outlet opening and a control base receptacle is located in an area farther from the outlet opening than is the swashplate. The hub drive of the invention thereby has only a few individual parts, all of which are easy to manufacture and assemble.

In one advantageous configuration of the invention, the axial piston motor is a fixed displacement motor and the swashplate is shaped into the machine housing. This arrangement minimizes the manufacturing cost for the above mentioned parts, because they are designed as one piece.

In another appropriate refinement of the invention, the swashplate is installed and oriented so that under operating conditions the radial components of the propulsion forces are effectively or substantially directed opposite to the external forces that are exerted on the hub bearing system. The load on the hub bearing system is thereby relieved, which contributes to an extended useful life.

In terms of assembly and installation, it is advantageous if a cover that is configured as a control base receptacle is detachably fastened to the machine housing.

In one advantageous embodiment of the hub drive of the invention, a brake is located radially between the cylinder block and the machine housing.

In one advantageous variant, it is also possible to locate a brake that is effectively or operationally connected with the machine shaft in a recess of the cover. The brake is thereby easier to access (to perform maintenance, for example). When the hub drive is installed, all that is necessary to access the brake is simply to remove the cover.

In this context it is appropriate if the brake has a spring-loaded brake piston which can be mechanically fixed in position against the action of the spring force on a spring abutment. Such a spring-loaded brake can be removed easily and without any danger of accidents when the brake piston is locked in position. This configuration also makes it possible to tow a vehicle that is equipped with the hub drive of the invention, if the brakes of the vehicle are closed and cannot be opened by the operating pressure, by mechanically releasing the brakes.

If the brake is in the form of a wet-running, spring-loaded, multiple-disc brake, advantages are achieved with regard to high performance and efficient utilization of the available space.

It is also advantageous if the machine housing has means for fastening the hub drive, wherein the cover can be removed even when the hub drive is fastened to the housing. It is thereby possible, for example, to perform maintenance activities on the brake without detaching the hub carrier.

To reduce the number of components, it is advantageous if a wheel flange that is designed to hold at least one wheel rim is shaped onto the machine shaft. This measure reduces the time, effort and expense of assembly. In this context, configurations are also possible in which the wheel flange has a rim centering device and concentric threaded borings.

BRIEF DESCRIPTION OF THE DRAWINGS

Additional advantages and details of the invention are explained in greater detail below with reference to the exemplary embodiments illustrated in the accompanying drawings, in which.

DESCRIPTION OF THE PREFERRED EMBODIMENTS

Figure 1:
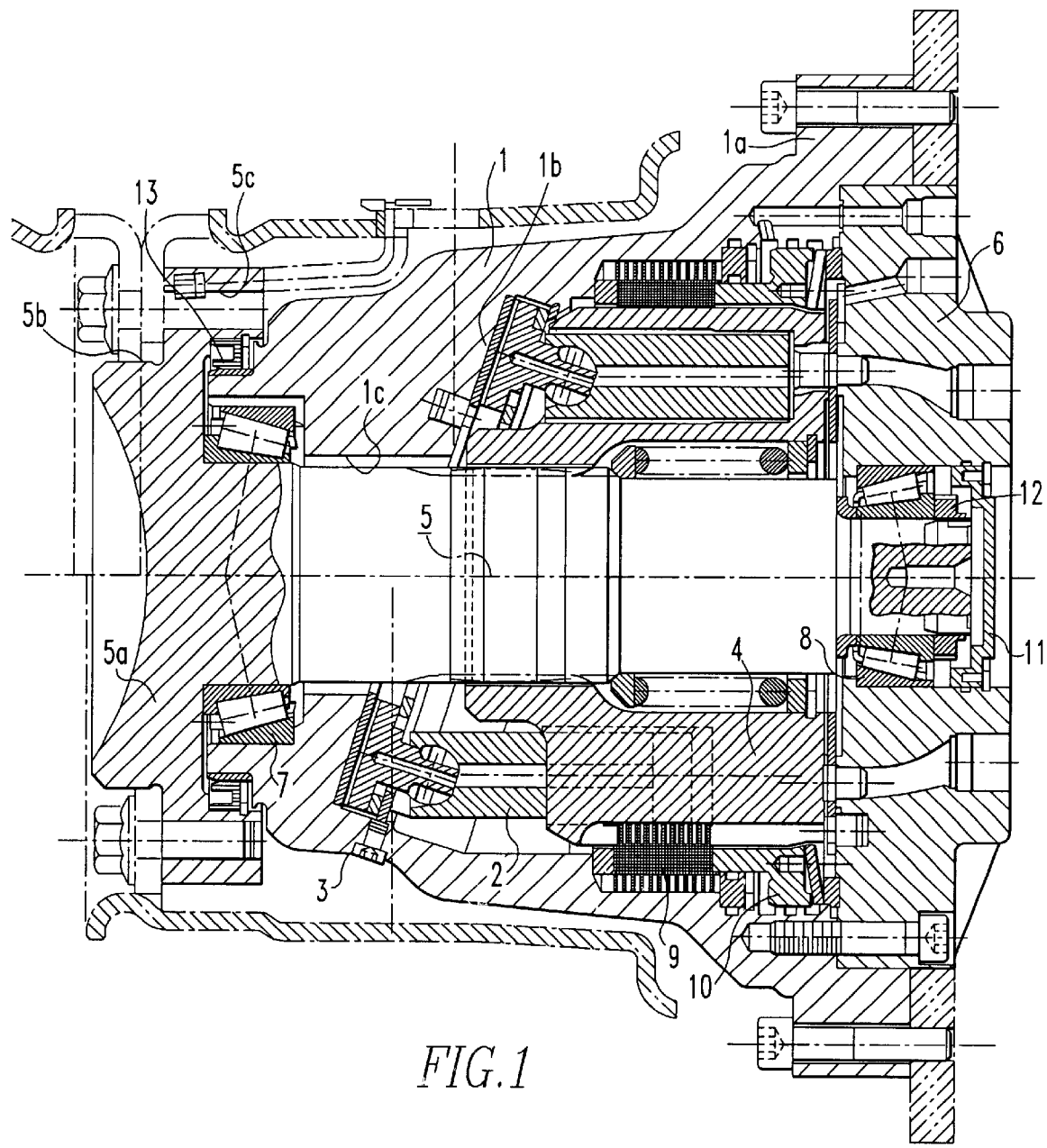
FIG. 1 is a sectional view of a hub drive of the invention having a brake.

A hydrostatic hub drive of the invention includes an integrated axial piston machine that employs a swashplate design with a fixed displacement volume. The hub drive has a hub carrier which is in the form of a machine housing 1 of the axial piston machine, and can be fastened in a suitable location by a fastening flange 1a. In the exemplary embodiment illustrated in FIG. 1, the hub drive is configured as a wheel motor.

Shaped into the interior of the machine housing 1 is a swashplate 1b, against which a plurality of pistons 2 are in contact by means of guide shoes 3. The pistons 2 can move longitudinally in concentric bores of a cylinder block 4, which is rotationally synchronously connected with a machine shaft 5. The machine shaft 5 forms the rotating hub of the hub drive of the invention and extends out of the machine housing 1 through an outlet opening 1c on the left end in the FIG. 1. A detachable cover 6 in the form of a control base receptacle closes the machine housing 1 on the side opposite the outlet opening 1c, i.e., is spaced from the outlet opening 1c. The cover 6 can be removed even when the hub drive is fastened to the machine housing 1.

The machine shaft 5 is mounted by two conical roller bearings 7 and 8 (although other types of bearings can also be used), whereby the left-hand bearing 7 in FIG. 1 is in the machine housing 1 and the right-hand bearing is in the cover 6. The conical roller bearings 7 and 8 absorb both external forces (wheel loads) and propulsion forces.

The swashplate 1b is installed and oriented so that under operating conditions, the radial components of the propulsion forces are directed opposite to the wheel loads (i.e. as shown in the FIG. 1, the swashplate 1b is inclined so that in the lower portion of the axial piston 5motor closer to the road, there is a greater axial distance from the cylinder block 4 than in the upper area). A long useful life of the conical roller bearings 7 and 8 is thereby achieved.

Shaped onto the machine shaft 5 to hold at least one wheel rim is a wheel flange 5a which has a rim centering device 5b and concentric threaded borings 5c. The hub drive of the invention can also be used for purposes other than driving vehicle wheels. For example, it can also be used to drive the rotating mechanisms on cranes. In that case, a gear wheel instead of the wheel flange 5a can be connected with the machine shaft 5.

Located radially between the cylinder block 4 and the machine housing 1 is a brake 9 that is preferably in the form of a spring-loaded multiple-disc brake 9 which can be hydraulically released by a ring-shaped brake piston 10.

The machine shaft 5 can be removed without having to remove the hub drive of the invention or without having to dismantle the brake 9. To remove the machine shaft 5, a cover plate 11 in the cover 6 is removed, and a shaft nut 12 is loosened and removed. The machine shaft 5 can then be pulled out of the hub drive to the left in FIG. 1, which makes it possible to replace the shaft O-ring 13, for example.

Figure 2:
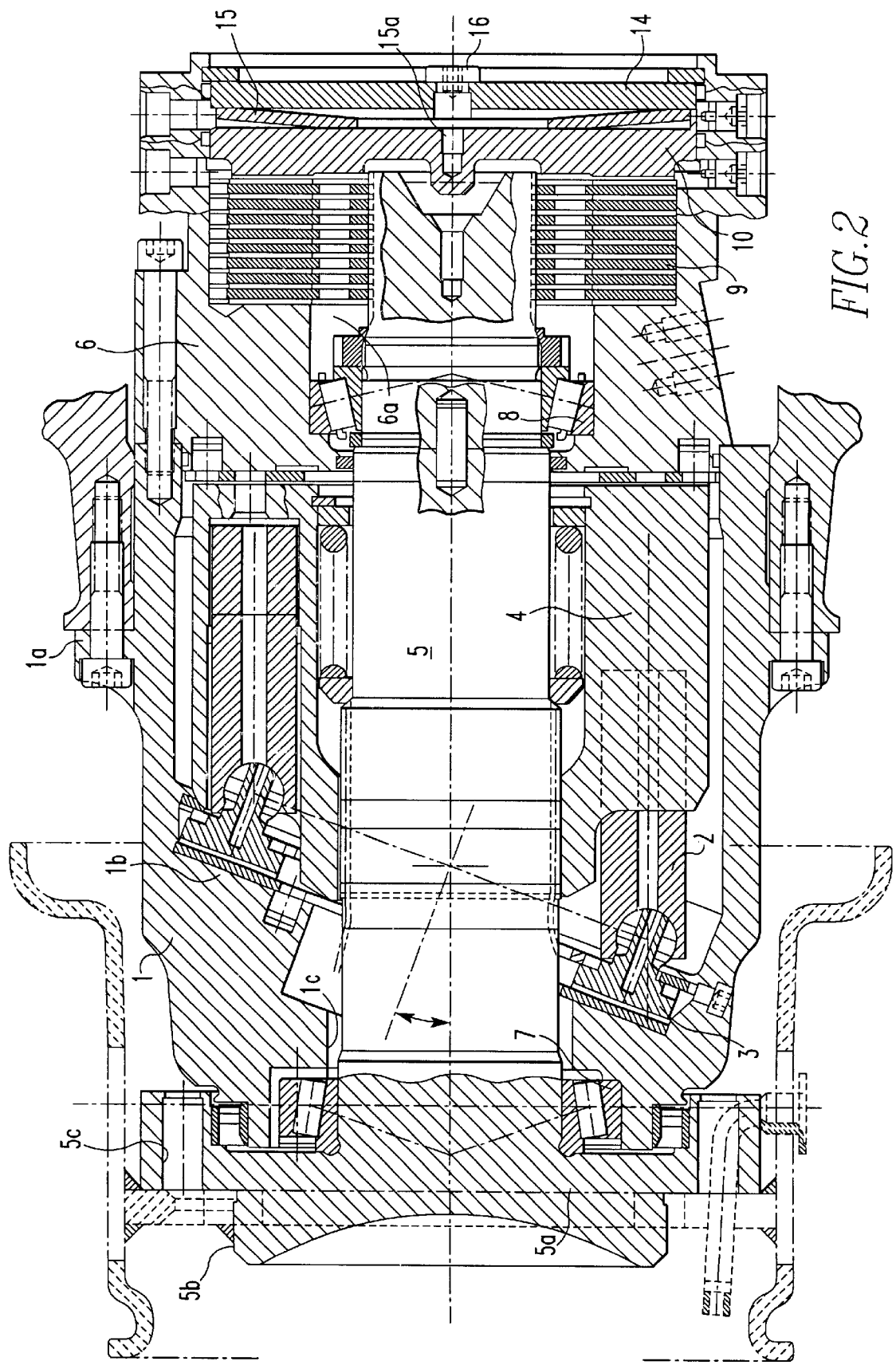
FIG. 2 is a sectional view of a hub drive as illustrated in FIG. 1 with a modified location of the brake.

FIG. 2 illustrates a variant of the hub of the invention described above. In this embodiment, the brake 9 is located in a recess 6a of the cover 6. Such an arrangement facilitates access to the brake 9. When the hub drive of the invention is installed, the brake 9 can be removed for maintenance purposes after removing a spring abutment 14.

The brake discs are engaged alternately with the machine shaft 5 and with the cover 6. The brake piston 10 can be fixed in position against the action of the spring force of a spring washer 15 on the spring abutment 14. (For example, by screwing an assembly screw into a threaded boring 15a of the spring abutment 14, after removing a cover screw 16.) The spring force can thereby be neutralized and the brake 9 can be easily and safely removed. A vehicle equipped with the hub drive of the invention, the brakes of which are locked and cannot be opened by means of the vehicle's operating pressure, can be towed after the brakes have been mechanically released.

I claim:

1. A hydrostatic hub drive having an integrated axial piston machine, comprising:
    an integrated axial piston machine having a swashplate;
    a stationary hub carrier comprising a machine housing of the axial piston machine;
    a hub formed by a machine shaft and mounted inside the hub carrier so that it can rotate; and
    a hub bearing comprising a shaft bearing,
    wherein the axial piston machine comprises an individual drive unit and has an individual cylinder block on the machine shaft, wherein the machine shaft extends out of the machine housing through an outlet opening, wherein the swashplate is located in an area near the outlet opening, and wherein a control base receptacle is located in an area farther from the outlet opening than is the swashplate.

2. The hydrostatic hub drive as claimed in claim 1, wherein the axial piston machine is a fixed displacement motor and the swashplate is shaped into the machine housing.

3. The hydrostatic hub drive as claimed in claim 2, wherein the swashplate is installed and oriented so that under operating conditions radial components of propulsion forces are substantially opposite to external forces that act on the hub drive.

4. The hydrostatic hub drive as claimed in claim 2, including a cover comprising the control base receptacle and detachably fastened to the machine housing.

5. The hydrostatic hub drive as claimed in claim 1, including a cover comprising the control base receptacle and detachably fastened to the machine housing.

6. The hydrostatic hub drive as claimed in claim 5, wherein the machine housing includes fastening means to fasten the hub drive, and wherein the over is detachable when the hub drive is fastened.

7. The hydrostatic hub drive as claimed in claim 6, wherein the fastening means comprise a fastening flange.

8. The hydrostatic hub drive as claimed in claim 1, wherein a wheel flange configured to hold at least one wheel rim is shaped onto the machine shaft.

9. The hydrostatic hub drive as claimed in claim 8, wherein the wheel flange includes a rim centering device.

10. The hydrostatic hub drive as claimed in claim 9, wherein the wheel flange includes concentric threaded borings.

11. A hydrostatic hub drive, comprising:
    an integrated axial piston machine having a swashplate;
    a stationary hub carrier comprising a machine housing of the axial piston machine;
    a hub formed by a machine shaft and mounted inside the hub carrier so that it can rotate; and
    a hub bearing comprising a shaft bearing,
    wherein the axial piston machine comprises an individual drive unit and has an individual cylinder block on the machine shaft, wherein the machine shaft extends out of the machine housing through an outlet opening, wherein the swashplate is located in an area near the outlet opening, wherein a control base receptacle is located in an area farther from the outlet opening than is the swashplate, and wherein a brake is located radially between the cylinder block and the machine housing.

12. The hydrostatic hub drive as claimed in claim 11, wherein the brake is a wet-running, spring-loaded, multiple-disc brake.

13. A hydrostatic hub drive, comprising:
    an integrated axial piston machine having a swashplate;
    a stationary hub carrier comprising a machine housing of the axial piston machine;
    a hub formed by a machine shaft and mounted inside the hub carrier so that it can rotate; and
    a hub bearing comprising a shaft bearing; and
    a cover comprising a control base receptacle and detachably fastened to the machine housing,
    wherein the axial piston machine comprises an individual drive unit and has an individual cylinder block on the machine shaft, wherein the machine shaft extends out of the machine housing through an outlet opening, wherein the swashplate is located in an area near the outlet opening, wherein the control base receptacle is located in an area farther from the outlet opening than is the swashplate, and wherein a brake is effectively connected with the machine shaft and is located in a recess in the cover.

14. The hydrostatic hub drive as claimed in claim 13, wherein the brake includes a spring-loaded brake piston which can be mechanically fixed in position against the action of the spring force on a spring abutment.

15. The hydrostatic hub drive as claimed in claim 14, wherein the brake is a wet-running, spring-loaded, multiple-disc brake.

16. The hydrostatic hub drive as claimed in claim 13, wherein the brake is a wet-running, spring-loaded, multiple-disc brake.

17. A hydrostatic hub drive, comprising:

an integrated axial piston machine having a swashplate;

a stationary hub carrier comprising a machine housing of the axial piston machine;

a hub formed by a machine shaft and mounted inside the hub carrier so that it can rotate; and a hub bearing comprising a shaft bearing, wherein the axial piston machine comprises an individual drive unit and has an individual cylinder block on the machine shaft, wherein the machine shaft extends out of the machine housing through an outlet opening, wherein the swashplate is located in an area near the outlet opening, wherein a control base receptacle is located in an area farther from the outlet opening than is the swashplate, wherein the axial piston machine is a fixed displacement motor and the swashplate is shaped into the machine housing, and wherein a brake is located radially between the cylinder block and the machine housing.

\* \* \* \* \*

UNITED STATES PATENT AND TRADEMARK OFFICE
CERTIFICATE OF CORRECTION

PATENT NO. : 6,443,290 B1
DATED : September 3, 2002
INVENTOR(S) : Franz Foster

It is certified that error appears in the above-identified patent and that said Letters Patent is hereby corrected as shown below:

Title page,
Item [57], ABSTRACT,
Line 23, "as a rim" should read -- has a rim --.

Column 3,
Line 5, "piston 5motor" should read -- piston motor --.

Column 4,
Line 15, "the over" should read -- the cover --.

Signed and Sealed this

Eighteenth Day of February, 2003

JAMES E. ROGAN
*Director of the United States Patent and Trademark Office*